US006401787B1

(12) United States Patent
Tsutsumi et al.

(10) Patent No.: US 6,401,787 B1
(45) Date of Patent: Jun. 11, 2002

(54) SINGLE DRUM TYPE THERMO SENSITIVE GLUE LABELER

(75) Inventors: Tatsuya Tsutsumi; Noboru Yamaguchi, both of Saitama (JP)

(73) Assignee: Sansei Seiki Co., Ltd., Saitama (JP)

( * ) Notice: Subject to any disclaimer, the term of this patent is extended or adjusted under 35 U.S.C. 154(b) by 0 days.

(21) Appl. No.: 09/556,831

(22) Filed: Apr. 21, 2000

(30) Foreign Application Priority Data

Apr. 22, 1999 (JP) .......................................... 11-152409

(51) Int. Cl.$^{7}$ ............................ B32B 31/00; B65C 9/14

(52) U.S. Cl. ...................... 156/542; 156/497; 156/521; 156/568; 156/DIG. 31; 156/DIG. 33

(58) Field of Search ............................. 156/380.9, 384, 156/497, 521, 541, 542, 568, DIG. 31, DIG. 33, DIG. 39

(56) References Cited

U.S. PATENT DOCUMENTS 5,885,406 A * 3/1999 Tiefel ........................ 156/542

* cited by examiner

*Primary Examiner*—Michael W. Ball
*Assistant Examiner*—John T. Haran
(74) *Attorney, Agent, or Firm*—Rader, Fishman and Grauer, PLLC

(57) ABSTRACT

This invention relates to a heat sensitive glue activating labeler using one drum in which a label adsorbing portion capable of being adjusted to a size of a label. The labeler of this invention is a single drum type heat sensitive glue activating labeler comprising: a printer which prints necessary matters on a surface opposite to a glue surface of a label sheet; a feed roll provided in front of the printer; a cutter for cutting the label sheet disposed next to the roll arranged at a position where at least a front end of a label piece cut is in brought into contact with a suction hole of an adhesion drum; a label adsorption portion formed on the drum so as to distribute label suction holes on a peripheral surface thereof; an air passage having one end open to a top surface of the drum and the other end connected to a decompressor; a label suction adhesion drum having the adhesion drum for connecting the air passage and the suction hole and a closing rod detachably inserted from an opening of the air passage on the top surface of the drum so as to close unnecessary suction holes; a heat sensitive glue activator arranged on a peripheral edge of the adhesion drum opposing to the drum surface; and a presser provided next to the activator to press a fed body to be adhered to the adhesion drum so as to adhere the label according to rotation of the drum.

19 Claims, 7 Drawing Sheets

PRIOR ART

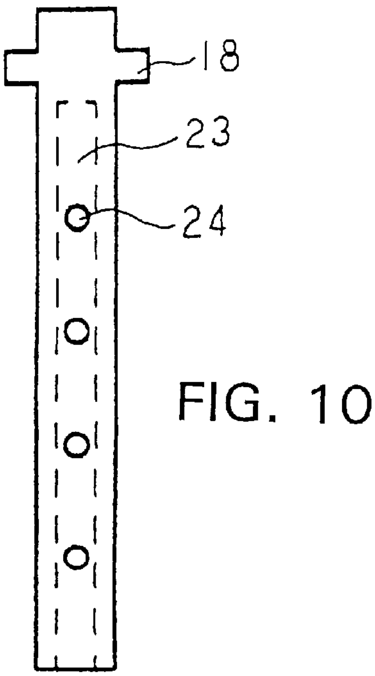
FIG. 10
FIG. 11
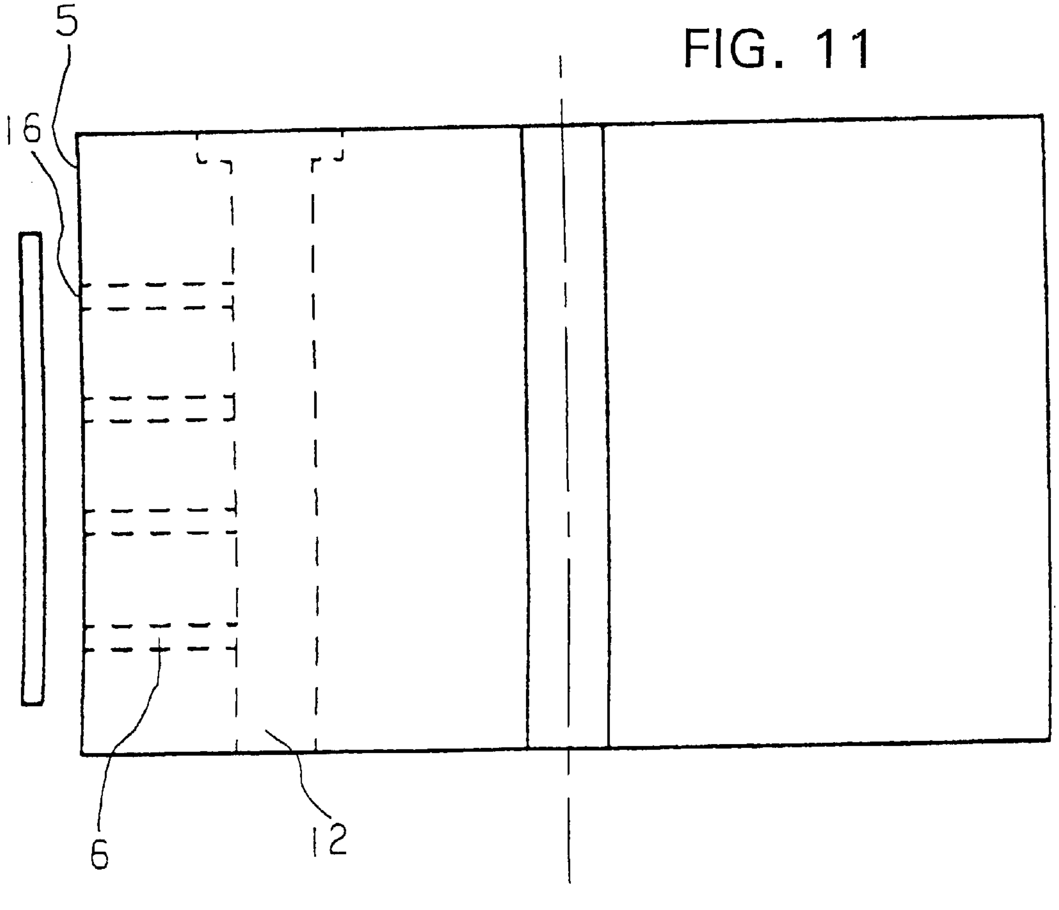

SINGLE DRUM TYPE THERMO SENSITIVE GLUE LABELER

FIELD OF THE INVENTION

The present invention relates to a labeler for adhering a heat sensitive label to a body to be adhered.

BACKGROUND OF THE INVENTION

A conventional labeler for adhering a heat sensitive label to a container or the like held a label by sucking a rear glue surface thereof with an adsorption hole formed on an adsorption drum. After the label was cut in a predetermined size, necessary matters on a outer surface opposite to the rear glue surface were printed. Then appropriateness of the printing is checked. Afterwards, the label having an inferior printing was removed, the printed surface of the label was absorbed with an adsorption hole formed on an adhesion drum to hold the label reversing the glue surface and the printed surface, the glue surface now on the outer side was activated, and then the label was adhered to the container or the like.

Thus, the adhesion drum was required to adsorb and hold the label in a state of directing the glue surface outward for activating the glue surface.

Accordingly, since the printing could not be performed on the adhesion drum, the adsorption drum for printing was required.

Further, the label had various sizes according to intended use. When a label is adsorbed by a labeler's adhesion drum, suction holes to be covered by the label were required for the adhesion drum. The suction holes consist of a plurality of holes. If, however, there is any suction hole which is not covered by the label, the suction pressure is reduced and the label would not be adsorbed.

Accordingly, in the current situation, a plurality of adhesion drums having a group of suction holes depending on the sizes of the labels are prepared, and the adhesion drums of the labeler are replaced depending on the variation of the labels to be adhered.

SUMMARY OF THE INVENTION

Since the conventional labeler using the conventional adsorption drum essentially required the adsorption drum, the apparatus was large in its size, and a large area was occupied by the apparatus. Further, adhering speed for the label was slow. Further, since it was necessary to accurately synchronize the adsorption drum and the adhesion drum, a controller therefor was needed to be attached to the apparatus. Thus, the operation of the apparatus became complex, so that an improvement was required.

The present invention solves these conventional problems by providing a single drum labeler which does not use an adsorption drum and only uses an adhesion drum.

Further, the conventional labeler required a lot of time and labor to replace the adhesion drum whenever a label size was changed. Accordingly, in addition to low label adhering efficiency, a plurality of drums were needed to be prepared. Thus, the conventional labeler was very inconvenient.

The present invention solves all of the problems by providing a label suction drum which can be applied to various sizes of labels by a single drum.

A single drum type heat sensitive glue activating labeler of this invention comprises: a printer which prints necessary matters on a surface opposite to a glue surface of a label sheet; a feed roll provided in front of the printer; a cutter which cuts the label sheet, provided adjacent to the roll, wherein at least a front end of a label piece cut is brought into contact with a suction hole of an adhesion drum; and a label adsorption portion formed so as to distribute label suction holes on a peripheral surface thereof. Further, an air passage having one end which is open to a top surface and the other end which is connected to a decompresser is placed. In addition, a label suction adhesion drum which comprises an adhesion drum connecting the air passage and the suction holes, a closing rod detachably inserted from an opening of the air passage on the top surface of the drum so as to close unnecessary suction holes; a heat sensitive glue activater which is arranged on a peripheral edge of the adhesion drum and faces to the drum surface; and a presser, provided next to the activater, which presses a fed body to be adhered to the adhesion drum whereby the label is adhered in accordance with rotation of the drum.

The cutter above may comprise a backplate and the cutter, wherein the backplate is arranged near the suction hole at the rear of the adhesion drum as seen from forward moving direction of the drum, and the cutter comprises a cutting blade brought into contact with the backplate.

The adhesion drum above may comprise a label adsorption portion which can handle a large sized label, wherein the label suction holes are distributed on the peripheral surface of the drum at the label adsorption portion.

BRIEF DESCRIPTION OF THE DRAWINGS

FIG. 10 is a schematic view of another closing rod employed for the present invention.

FIG. 11 is a schematic view of a label adsorption drum using the closing rod shown in FIG. 10.

PREFERRED EMBODIMENTS OF THE INVENTION

Figure 1:
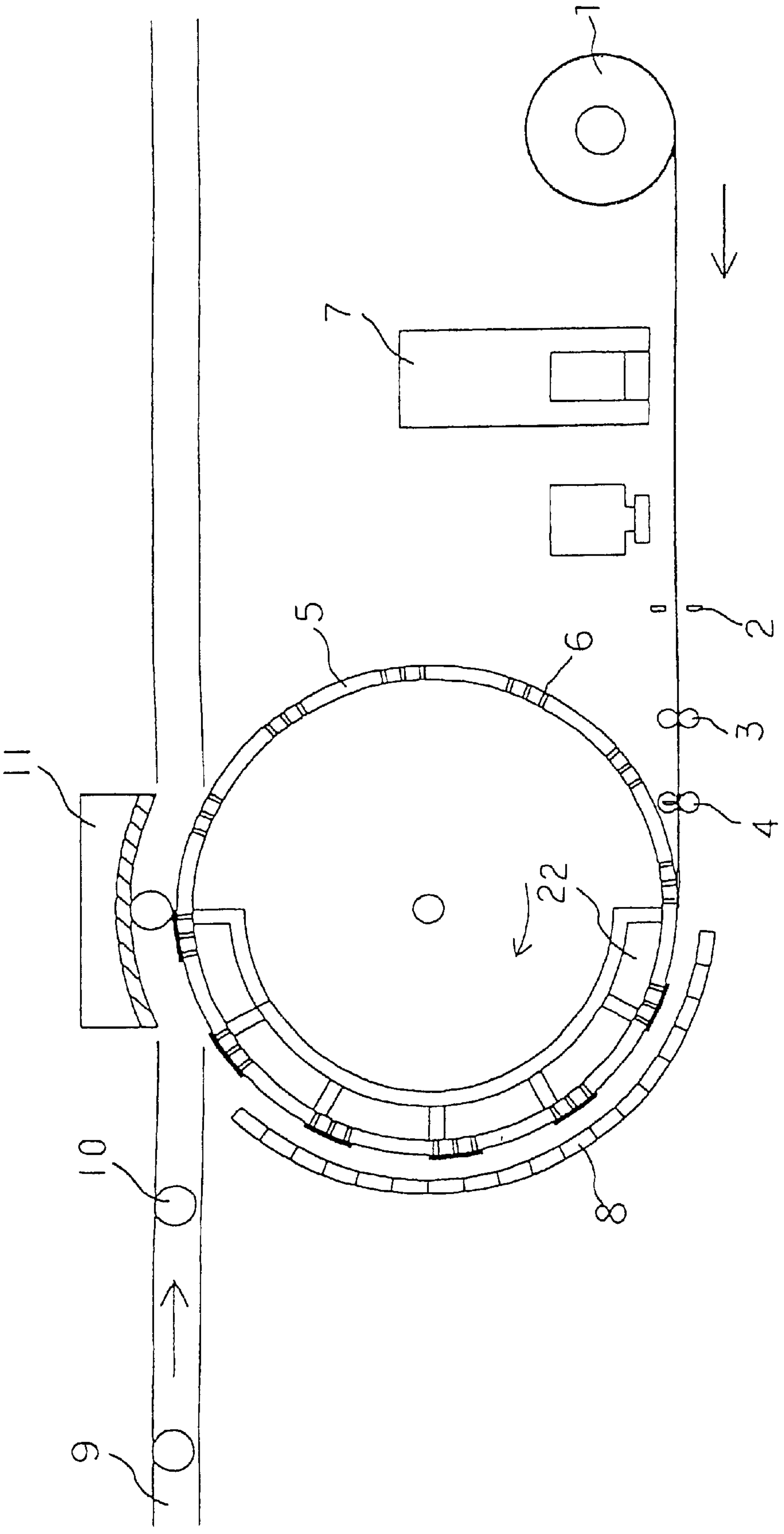
FIG. 1 is a schematic view of an embodiment of a labeler in accordance with the present invention.

The present invention does not use an adsorption drum. Since the adhesion drum should adsorb the opposite surface of the glue surface for activating the glue, it is impossible to print the necessary matters on the opposite surface of the glue surface of the label, if the adsorption drum is removed.

In accordance with the present invention, the necessary matters are printed on the opposite surface of the glue surface by means of a printer and a cutter arranged on a plane before the label reaches the adhesion drum. The label is fed to the adhesion drum side by means of the feed roll, and the label is cut into independent label pieces at the position near the adhesion drum or on the adhesion drum by means of the cutter, whereby the adsorption drum is not required. The position of the cutter should be a position at which at least the front end portion of the label piece as seen from the direction of feeding the cut label is brought into contact with the adsorption hole of the adhesion drum. This is because the cut label piece is adsorbed to the adhesion drum only at this position.

As the cutter is provided at the position near the adhesion drum, there is employed such a cutter as having a cutting blade and a roll which is brought into contact with a rotary blade, wherein the label sheet is inserted between the roll and rotary blade. As the cutter is placed on the adhesion drum, there is employed such a cutter as having a backplate provided near the suction hole at the rear of the adhesion drum and a cutting blade.

The surface opposite to the glue surface of the label piece on which the necessary matters are printed and which is individually cut is sucked to the adsorption hole of the adhesion drum and held.

The label adhesion drum of the labeler is structured such that the suction holes for adsorbing a label are arranged on the circumferential side surface. The suction holes are distributed in the area corresponding to the size of a label to be sucked, each of the suction holes is connected to an air passage extending in the axial direction of the drum, and the air passage is connected to the decompressor. The most popular decompressor is a vacuum pump.

The label supplied to the adhesion drum is adsorbed covering the suction hole, passes through the heating and activating zone in accordance with the drum rotation, and is pressurized to the object to be adhered.

The adhesion drum in accordance with the present invention is structured such that an air passage having one end open to the top surface of the drum and the other end connected to the decompressor is placed in the adhesion drum. The air passage and the suction holes are connected to each other, and a closing rod is inserted to the air passage from the air passage opening so as to close an unnecessary suction hole which does not suck the label among the suction holes connected to the air passage, thereby suction hole distribution is adjusted in accordance with the label.

As mentioned above, only one adhesion drum having the suction holes distributed in the suction area corresponding to a label of largest size may adhere a label of any size by closing unnecessary suction holes.

In accordance with the present invention, since an unnecessary suction hole can be closed even though the adhesion drum is still installed in the labeler, it is not necessary to take the drum out of the labeler.

When a closing rod is provided, it is preferable to form a head portion which protrudes out of the air passage opening at the top surface for the convenience of inserting and drawing operation of the closing rod. The length of the closing rod is preferably set to reach the suction hole in the lowermost layer.

The closing rod may be in the same number as that of suction holes, and may have length in conformity with the distance between the top surface of the drum and each of the suction holes. Alternatively, an insertion length adjusting part can be provided in the closing rod having a length reaching the suction hole in the lowermost layer, whereby only one kind of closing rod may be used. The adjusting part may be structured such that an adjusting hole is provided in conformity with the distance between the suction hole and the drum top surface. The insertion length may be adjusted by inserting a stop pin to the hole, thereby closing each of the suction holes by means of one rod. Alternatively, the closing rod may be screwed into the air passage so as to adjust the insertion distance. For the convenience of the explanation, it is described that the air passage opening to which the closing rod is inserted is provided on the top surface of the adhesion drum. However, the air passage opening can be provided on the opposite surface opposite to the top surface of the adhesion drum and the closing rod can be inserted from the opposite surface. Alternatively, the air passage opening can be provided on both top and opposite surfaces and the closing rods can be inserted from the both surfaces.

The closing rod is inserted into the air passage from the air passage opening. However, since force to extract the closing rod does not operate when the adhesion drum is in operation, an engagement of the closing rod and the air passage can be made by dropping the closing rod into the air passage in the manner that the diameter of the rod is made a little bit smaller than that of the air passage opening to achieve large contact friction. Of course, fixing means such as screwing to the air passage opening may be employed.

Since the air passage opening is provided on the drum top surface as mentioned above, the head portion of the closing rod does not protrude from the drum peripheral surface having the suction holes arranged thereon when inserting the closing rod. Thus, an advantage that no affect is given to the label adsorbing surface can be achieved.

It is not preferable to close the suction hole on the peripheral surface of the adhesion drum by inserting the closing rod, because the peripheral surface of the drum is to be formed in an uneven shape, whereby the pressure adsorption between the container and the label is badly influenced. In addition, since a centrifugal force is operated due to the rotation of the drum, the closing rod is likely to be taken out of the suction hole. As the consequence, adhesion is required.

The heat sensitive glue activator which is arranged on the peripheral edge of the adhesion drum in such a manner as to oppose to the drum surface in accordance with the present invention to heat and activate the heat sensitive glue. The suitable ways such as hot air heating or halogen lamp heating can be used. Particularly, a near infrared radiation may be employed for the heater.

However, hot air heating may cause problems such as noise, high volume of hot air exhaust generated, or low heating efficiency and the like. On the other hand, halogen lamp heating causes other problems such that a heat absorption rate of a paper in a range of wavelength of the near infrared radiation generated by the halogen lamp is between 1 and 40%, which is significantly low for a high-speed labeler. Since a base material of the label is a paper, it would take long time to activate heat sensitive glue when the heat absorption rate is low, which is another problem.

A most preferable heat sensitive glue activater is a far infrared radiation heater. The heater provided opposite to the outer periphery of the adhesion drum is preferably arranged in such a manner that the heater surrounds at least one third of the entire peripheral length of the outer periphery of the drum, in view of the glue activation and the adhesion speed of the label.

A ceramic far infrared radiation heater is available in the market and irradiates heat by converting hot radiation from a heat generating body into far infrared radiation by means of a ceramic layer. In particular, a metal thin belt-shaped body is used as the heat generating body, the surface on which a ceramic layer is provided, and is energized so as to irradiate the far infrared radiation.

The far infrared radiation heater can also be arranged on the adhesion drum. In this case, the ceramic layer is provided on the outer peripheral surface of the adhesion drum, and an induction heating coil is arranged within the drum and energized so as to heat the drum, whereby the far infrared radiation is irradiated from the ceramic layer and the glue on the heat sensitive label is activated.

Of course, both types of heaters may be provided.

As for the ceramic for irradiating the far infrared radiation, a far infrared radiation heating system manufactured by NGK INSULATORS, LTD. or the like can be used.

Since a far infrared radiation having a wavelength of 2.5·m to 25·m is irradiated by a far infrared radiation heater, the heat absorption rate of the paper with this wavelength is about 80%. This is really preferable for heating an object having paper as the base material, such as label, which makes it possible to activate the heat sensitive glue for a short time. This heat absorption rate of the paper is quite excellent when it is compared with that achieved by the near infrared radiation, which is about 1 to 40%.

The label on which the glue is activated forward moves to the position where the object to be adhered is fed due to the rotation of the adhesion drum. The object to be adhered is pressed to the adhesion drum by the presser and adheres the label while rotating. The known apparatus is used as the presser. However, for the purpose of making the structure simple, an arc-shaped pressing guide along the adhesion drum surface and a pressing roll are preferable.

The present invention does not require detecting an inferior printing as an essential element. Of course, it is possible to arrange the detecting means of this kind, however, since an erroneous operation of the printer is very rare and the application field includes a field in which a little amount of indefinite printing is allowed and a field in which an operator inspects and remove an inferiority at a time of packaging in addition to a field such as a medicine container in which an inferior printing is not allowed absolutely, the present invention does not require the inferior printing detection in order to include both of the utilized fields.

Further, the near infrared radiation heating is not excluded from the present invention although the heating efficiency is inferior.

Embodiments

The present invention will be particularly described with reference to embodiments.

FIG. 1 particularly shows an embodiment of a single drum type labeler in accordance with the present invention.

Reference numeral 1 denotes a heat sensitive label sheet which is wound so as to form a roll with setting a glue surface inside. Cut marks to be read are printed on the label sheet for cutting into labels at a fixed size. Reference numeral 7 denotes a printer which prints necessary matters on a surface of the label sheet. The label sheet is fed to an adhesion drum by a feed roll 3.

Reference numeral 2 denotes a reader which reads cut marks printed on the label sheet, and outputs a signal to a cutter 4 at the next stage to have the label sheet cut. The cutter is shown at a position apart from the adhesion drum 5 in FIG. 1 for the purpose of being easily understood. However, the cutter is actually provided at a position where the cut label can be sucked to suction holes 6 of the adhesion drum. The cutter 4 has a rotary blade and a roll which is brought into contact therewith.

Reference numeral 5 denotes an adhesion drum, in which suction holes 6 for sucking the label are arranged on a peripheral edge thereof. The suction holes are distributed within a range to be covered by the label.

Reference numeral 22 denotes an exhaust passage arranged within the adhesion drum and connected to the suction holes. The exhaust passage is connected to a pressure reduction pump and is controlled so that a suction is stopped at a stage that the label is pressed and adhered to a container 10 by a presser 11 and the label can be easily adhered.

Reference numeral 8 denotes a glue activater arranged in opposite to the surface of the adhesion drum. In this embodiment, the activater uses a far infrared radiation ceramic manufactured by NGK INSULATORS, LTD. and heats the ceramic by an induction heating coil (not shown) so as to radiate a far infrared radiation.

Reference numeral 9 denotes a conveyor which transfers an object to be adhered 10 to the adhesion drum. Reference numeral 11 denotes a presser which presses the object to be adhered to the adhesion drum so as to adhere the label. In this embodiment, a pressing guide is employed as a presser, however, a pressing roll or the like can also be used alternatively.

The object to be adhered 10 rotates according to the rotation of the adhesion drum while being pressed onto the adhesion drum by the presser and winds the label to be adhered.

Figure 2:
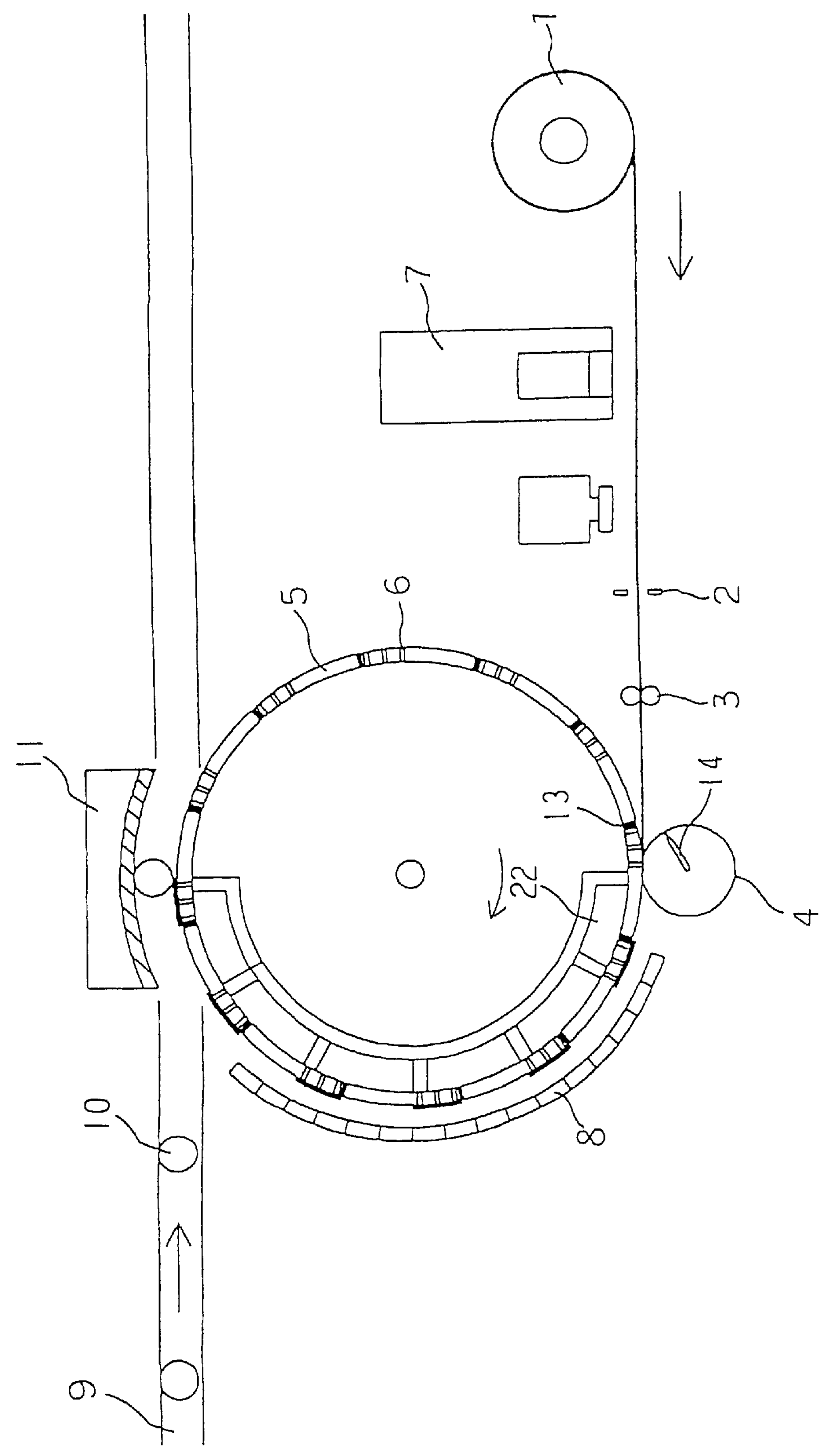
FIG. 2 is a schematic view of another embodiment of a labeler in accordance with the present invention.

FIG. 2 shows an embodiment having a cutter backplate 13 and a cutting blade 14 provided on the adhesion drum. Other structures of this embodiment are the same as those shown in FIG. 1. In this embodiment, the backplate 13 is arranged near the rearmost label suction hole 6 of the adhesion drum as seen from its forward moving direction. After the fed sheet is adsorbed to the suction holes, the cutting blade 14 is brought into contact with the backplate 13, and the rear end of the sheet for a label is cut. This embodiment has an advantage that the cut label is always adsorbed to the adhesion drum.

Figure 3:
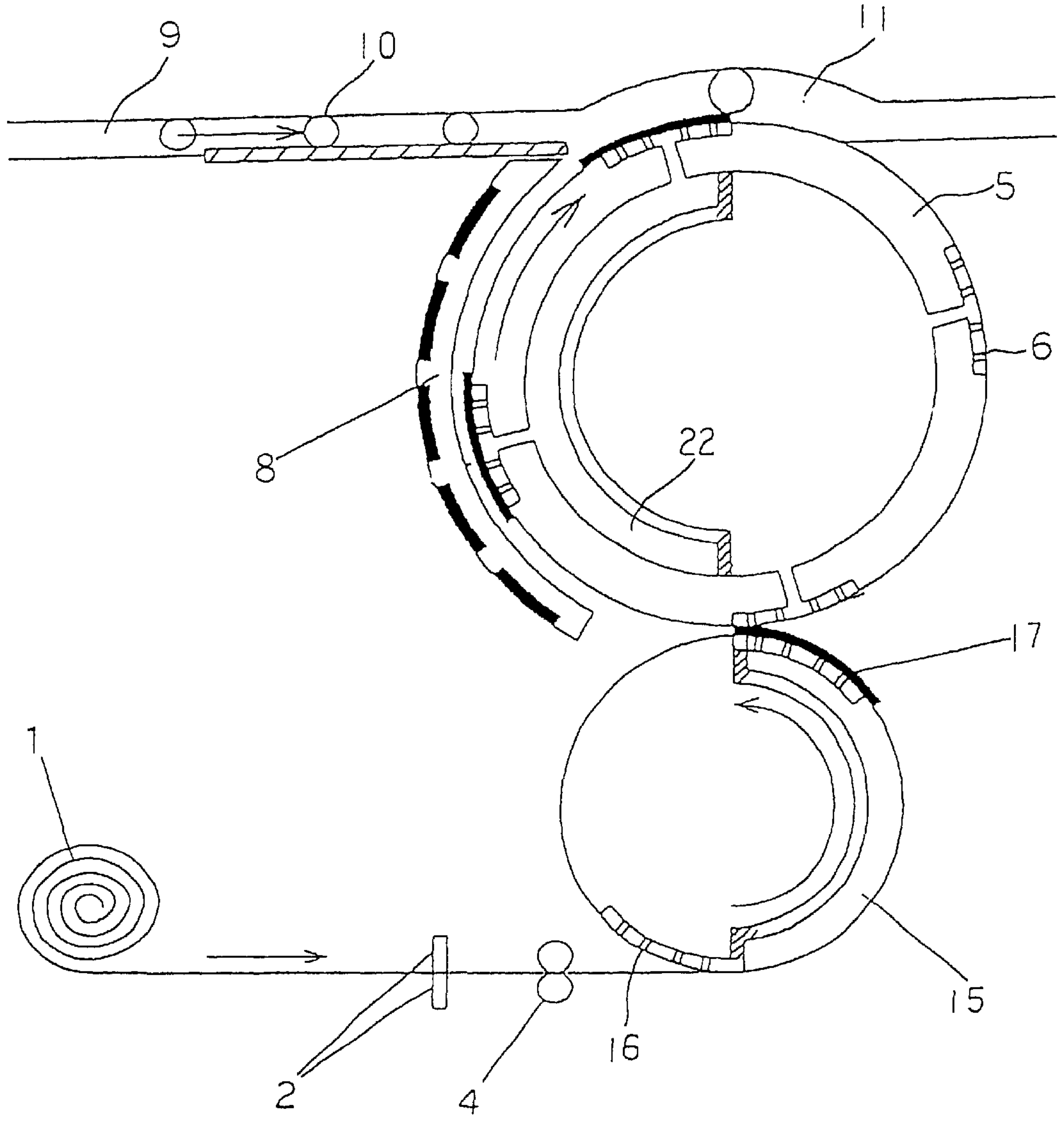
FIG. 3 is a schematic view of a conventional labeler.

FIG. 3 shows a conventional labeler. In this labeler, reference numeral 15 denotes an adsorption drum. Adsorption holes 16 of the adsorption drum absorb and hold a label 17 cut in a predetermined size. Prints are provided onto a surface having no glue on the adsorption drum by means of a printer (not shown). After print inspection is performed, a label having an inferior printing is removed. The adhesion drum 5 adsorbs the printing surface to transfer. As mentioned above, two drums are required.

Figure 4:
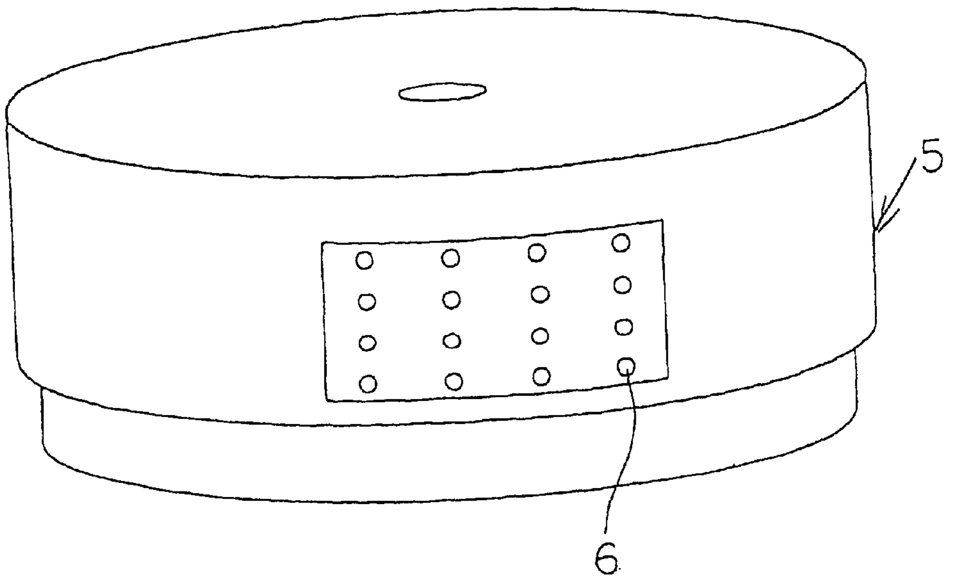
PRIOR ART FIG. 4
FIG. 4 is a schematic view of a conventional adhesion drum employed for a large sized label.

FIG. 4 shows a conventional adhesion drum. In this adhesion drum, the suction holes 6 are distributed on a circumferential side surface of the adhesion drum 5 in conformity with a size of the label so as to form an adsorbing portion.

Figure 5:
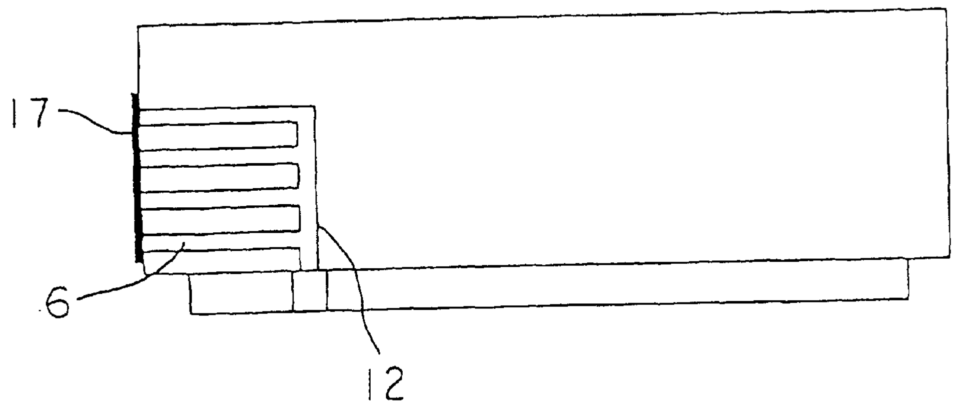
PRIOR ART FIG. 5
FIG. 5 is a cross sectional view of the adhesion drum shown in FIG. 4.

FIG. 5 is a cross sectional view of the drum shown in FIG. 4. Reference numeral 6 denotes a label suction hole. The label suction hole 6 is open to a circumferential side surface and connected to the air passage 12. The air passage is connected to a depressor (not shown) of the drum. A label 17 is adsorbed by the label adsorption hole.

Figure 6:
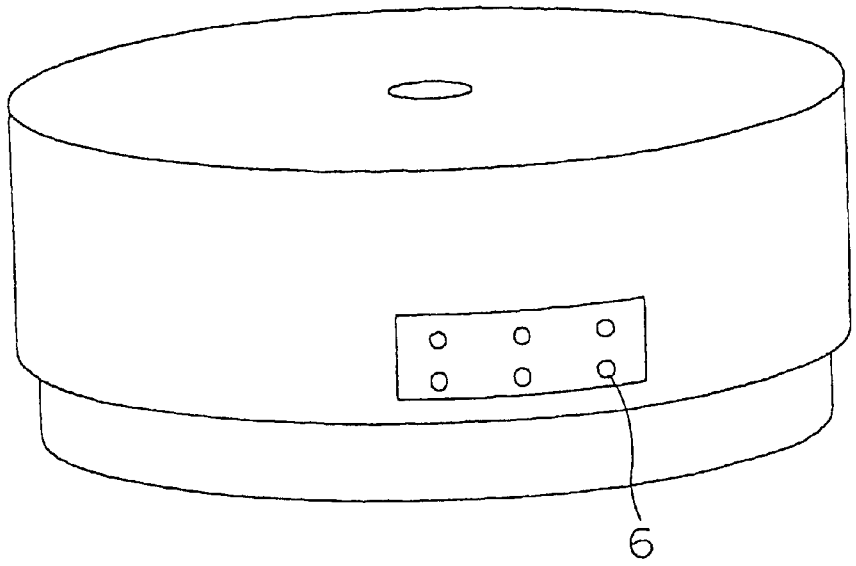
PRIOR ART FIG. 6
FIG. 6 is a schematic view of a conventional adhesion drum employed for a small sized label.

FIG. 6 shows an adhesion drum for sucking and adsorbing a smaller label. The suction holes 6 are distributed in an area narrower than the adhesion drum.

Figure 7:
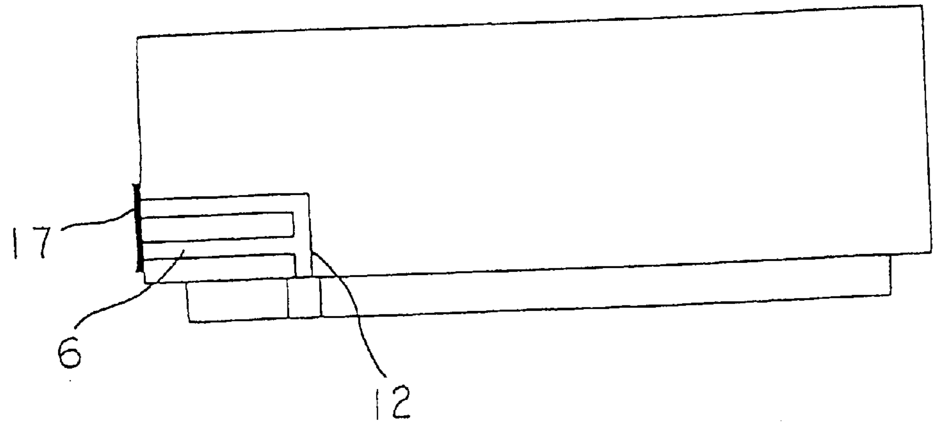
PRIOR ART FIG. 7
FIG. 7 is a cross sectional view of the adhesion drum shown in FIG. 4.

FIG. 7 is a cross sectional view of FIG. 6. The suction holes 6 are distributed in a narrower area and adsorb the smaller label 17.

As mentioned above, the conventional labeler requires a plurality of adhesion drums on which the suction holes are arranged in the distribution in conformity with label size, and requires the adhesion drum be replaced every time the label size is changed.

Figure 8:
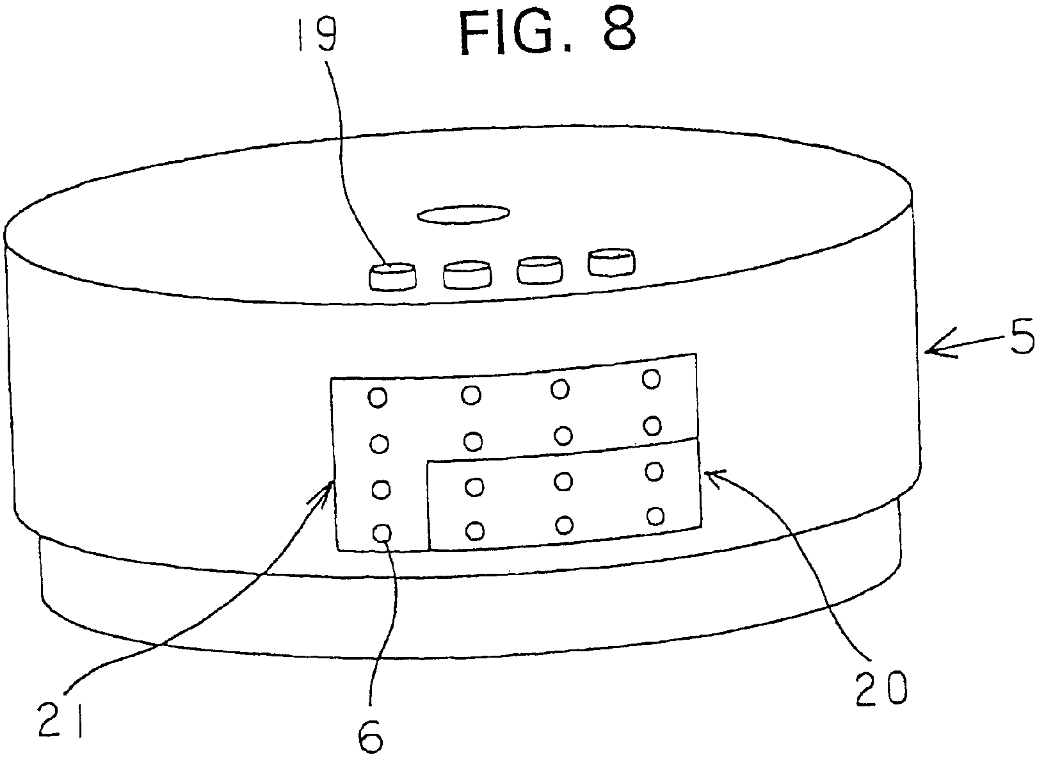
FIG. 8 is a schematic view of an adhesion drum employed for the present invention.
Figure 9:
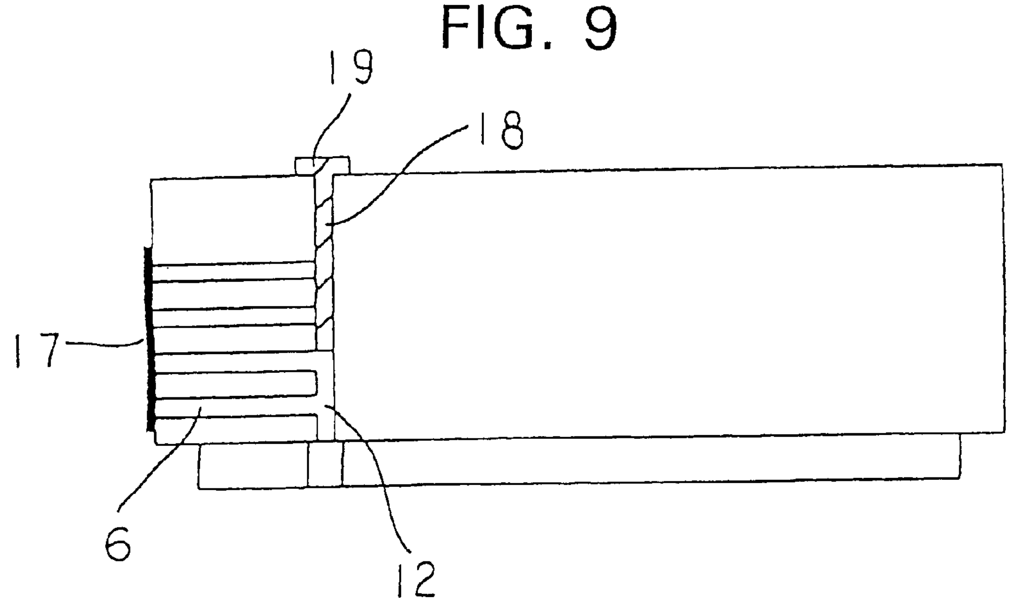
FIG. 9 is a cross sectional view of the adhesion drum shown in FIG. 8.

FIG. 8 shows an embodiment in accordance with the present invention. The label suction hole 6 is connected to the air passage 12 as is apparent from FIG. 9 corresponding to a cross sectional view of FIG. 8. An end of the air passage is open to a top surface of the drum, and another end thereof is connected to a decompressor (not shown).

Reference numeral 21 in FIG. 8 denotes a wide adsorbing portion formed by the suction holes arranged in a wide distribution area corresponding to a large label. Reference numeral 20 denotes a narrow adsorbing portion at which the suction holes are arranged in a narrow distribution area corresponding to a small label adsorbed in accordance with this embodiment.

According to this embodiment, the four left most suction holes are closed by inserting a closing rod 18 having a length equal to a distance between the top surface and the lower portion of the suction hole at the left most and lowermost end of an air passage opening. Next, the upper two suction holes among the suction holes in the second row from the left are closed by inserting a closing rod 18 having a length equal to a distance between the top surface and the lower portion of the second suction hole from the upper surface. Likewise, the suction holes at the third row from the left and at the right most row are also closed in the same manner as mentioned above. The closed state is now described with reference to FIG. 9. The closing rod is inserted from the air passage opening of the top surface to the second suction hole from the upper side so as to close these suction holes, and the small label is adsorbed by the two suction holes left.

As mentioned above, a single adhesion drum can adhere a multiple kinds of labels by having the suction holes on the adhesion drum closed as occasionally demanded.

FIG. 10 shows another embodiment of this invention. In this embodiment, a closing rod 18 is a hollow rod in which one end is sealed and the other end is opened. Reference numeral 23 denotes a hollow portion of the rod. This hollow portion 23 is communicated with the exhaust passage of the drum by an opening portion. A plurality of air holes 24 in accordance with the number of the label suction holes are arranged in a body portion of the rod. It is preferable that the air holes are not arranged within a straight line in an axial direction and are distributed in a peripheral surface of the rod, because the area covering various sizes of labels can then be increased. The rod is inserted from the ventilation opening on the adhesion drum 5 to the air passage 12 as shown in FIG. 11 so as to close the label suction hole 6. Then, the rod is rotated so as to coincide the ventilation holes 24 of the closing rod with the necessary label suction holes 6, thereby communicating the label suction holes 6 with the exhaust passage, and the label is adsorbed by the label adsorbing holes 16 communicated with the suction holes.

When employing the closing rod in accordance with this embodiment, one rod can seal the unnecessary label suction holes in correspondence to the labels in different sizes.

In accordance with the present invention, since a label sheet, a printer, a cut mark reader and a cutter are arranged on one plane. An defective label discharging apparatus and a glue activating apparatus are successively arranged on an adhesion drum. A heat sensitive label can be adhered to an object to be adhered without using an adsorption drum arranged in front of the adhesion drum which was conventionally considered to be essential. Accordingly, it has become possible to make a labeler in a compact size, to reduce energy to be used and to increase adhesion speed. Further, since label suction holes are controlled by the closing rod, an advantage that only one adhesion drum can treat with all the labels can be achieved.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

What is claimed is:

1. A single drum heat sensitive glue activating labeler comprising:

(a) a printer which prints necessary matter on a surface of a label sheet wherein said surface is opposite to a glue surface of the label sheet, and a feed roll provided in front of the printer;

(b) a cutter disposed next to said feed roll, wherein said cutter cuts the label sheet into a label piece and is arranged at a position where at least a front end of the label piece is brought into contact with one of a plurality of label suction holes of an adhesion drum;

(c) the adhesion drum that comprises a label adsorption part having a peripheral surface that includes said label suction holes, an air passage having one end open to a top surface of the adhesion drum and another end connected to a decompressor, said air passage being connected to the suction holes, said adhesion drum further comprising a closing rod which is detachably inserted from the open end of the air passage at the top surface of the drum into the air passage, wherein said closing rod closes unnecessary suction holes;

(d) a heat sensitive glue activator arranged adjacent the peripheral surface of said adhesion drum opposed to the adhesion drum surface; and (e) a presser provided next to said heat sensitive glue activator and pressing a fed body to be adhered to the adhesion drum so as to adhere the label piece.

2. A single drum heat sensitive glue activating labeler as claimed in claim 1, wherein the cutter for the label sheet is a cutter comprising a backplate arranged near the suction holes at a rear of the adhesion drum, and a cutting blade of said cutter is brought into contact with said backplate.

3. A single drum heat sensitive glue activating labeler as claimed in claim 1, wherein the label suction holes are distributed on the peripheral surface of the adhesion drum, said label suction holes form a label adsorption portion corresponding to a predetermined size of the label piece.

4. A single drum heat sensitive glue activating labeler as claimed in claim 1, wherein the closing rod has a length reaching one of said suction holes in a lowermost layer from the top surface of the drum.

5. A single drum heat sensitive glue activating labeler as claimed in claim 1, wherein the closing rod has a head portion which is not inserted into the open end of the air passage.

6. A single drum heat sensitive glue activating labeler as claimed in claim 1, wherein the closing rod comprises an insertion length adjustment portion for adjusting a length of the closing rod.

7. A single drum heat sensitive glue activating labeler as claimed in claim 1, wherein the closing rod is a hollow rod having one end being sealed and another end being opened, ventilation holes communicating with the label suction holes are arranged at a plurality of positions of a cylinder wall portion of the closing rod, and the closing rod has a hollow portion communicating with the air passage.

8. A single drum heat sensitive glue activating labeler as claimed in claim 7, wherein the closing rod is inserted from the opening of the air passage on the top surface of the adhesion drum and is rotatable to communicate the ventilation holes with the label suction holes of said adhesion drum.

9. A single drum heat sensitive glue activating labeler as claimed in claim 1, wherein the decompressor stops a suction operation when the fed body is pressed by the presser to adhere the label piece.

10. A single drum heat sensitive glue activating labeler as claimed in claim 1, wherein the heat sensitive glue activator is a far infrared radiation heater and is a heater which activates a glue surface of a heat sensitive label.

11. A single drum heat sensitive glue activating labeler as claimed in claim 1, wherein the heat sensitive glue activator is a near infrared radiation heater and activates a glue surface of the label piece.

12. A single drum heat sensitive glue activating labeler as claimed in claim 1, wherein the presser is a circular arc shaped pressing guide which is arranged along the peripheral surface of the adhesion drum.

13. A single drum heat sensitive glue activating labeler comprising:

an adhesion drum;

a label piece having an adhesive surface and a non-adhesive surface, wherein at least a front end of the label piece is brought into contact with one of a plurality of label suction holes of the adhesion drum;

wherein the adhesion drum comprises a label adsorption part having a peripheral surface that includes said label suction holes, an air passage having one end open to a top surface of the adhesion drum and another end connected to a decompressor, said air passage being connected to the suction holes, said adhesion drum further comprising a closing rod which is detachably inserted from the open end of the air passage at the top surface of the drum into the air passage, wherein said closing rod closes unnecessary suction holes.

14. A single drum heat sensitive glue activating labeler according to claim 13 wherein said labeler comprising:

a heat sensitive glue activator arranged adjacent the peripheral surface of said adhesion drum opposed to the adhesion drum surface.

15. A single drum heat sensitive glue activating labeler as claimed in claim 13, wherein the closing rod has a length reaching one of said suction holes in a lowermost layer from the top surface of the drum.

16. A single drum heat sensitive glue activating labeler as claimed in claim 13, wherein the closing rod has a head portion which is not inserted into the open end of the air passage.

17. A single drum heat sensitive glue activating labeler as claimed in claim 13, wherein the closing rod comprises an insertion length adjustment portion for adjusting a length of the closing rod.

18. A single drum heat sensitive glue activating labeler as claimed in claim 13, wherein the closing rod is a hollow rod having one end being sealed and another end being opened, ventilation holes communicating with the label suction holes are arranged at a plurality of positions of a cylinder wall portion of the closing rod, and the closing rod has a hollow portion communicating with the air passage.

19. A single drum heat sensitive glue activating labeler as claimed in claim 18, wherein the closing rod is inserted from the opening of the air passage on the top surface of the adhesion drum and is rotatable to communicate the ventilation holes with the label suction holes of said adhesion drum.

* * * * *